(12) United States Patent
Brock et al.

(10) Patent No.: US 6,480,273 B1
(45) Date of Patent: Nov. 12, 2002

(54) MULTISPECTRAL IMAGING SYSTEM AND METHOD

(75) Inventors: John C. Brock, Redondo Beach, CA (US); Richard L. Davis, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/567,745

(22) Filed: May 10, 2000

(51) Int. Cl.$^7$ .................................. G01J 3/00
(52) U.S. Cl. ....................... 356/300; 356/310; 382/165; 382/191; 382/211
(58) Field of Search .................. 356/300, 310, 356/330; 382/164, 165, 191, 209, 210, 211

(56) References Cited

U.S. PATENT DOCUMENTS

| | | | |
|---|---|---|---|
| H780 H | 5/1990 | Hartman | |
| 5,329,595 A | 7/1994 | Davies | |
| 5,479,255 A | 12/1995 | Denny et al. | |
| 5,534,704 A | * 7/1996 | Robinson et al. | ........... 250/550 |
| H84 H | 7/1986 | Bumgardner | |

* cited by examiner

Primary Examiner—F. L. Evans
(74) Attorney, Agent, or Firm—Antonelli, Terry, Stout & Kraus, LLP

(57) ABSTRACT

A multispectral imaging system (1) and method utilize an optical processor (3) for simultaneously comparing an input wavelength spectrum observed in a single spatial pixel in a scene image from a multispectral imager (2) with a plurality of template wavelength spectra to find a correlation. The optical processor exploits the three-dimensional attributes of optical correlation to perform massively parallel correlation processing by modulating (4) respective ones of a plurality of spectral bands of the input wavelength spectrum of an incident light beam (6) with modulating elements (5) to alter at least one property of the incident light beam by a value corresponding to the observed intensity of the input spectrum in the respective spectral band. In a disclosed embodiment, the modulated beam is expanded and transited through a spatial light modulator (7) having a two-dimensional array of modulating elements. Each row of the elements of the array alter the at least one property of the incident light by values corresponding to a particular template wavelength spectrum of a plurality of template wavelength spectra of the modulator. The values corresponding to each template spectrum are the conjugates of the representative values of the modulating elements of the template spectrum of the plurality of template spectra.

20 Claims, 2 Drawing Sheets

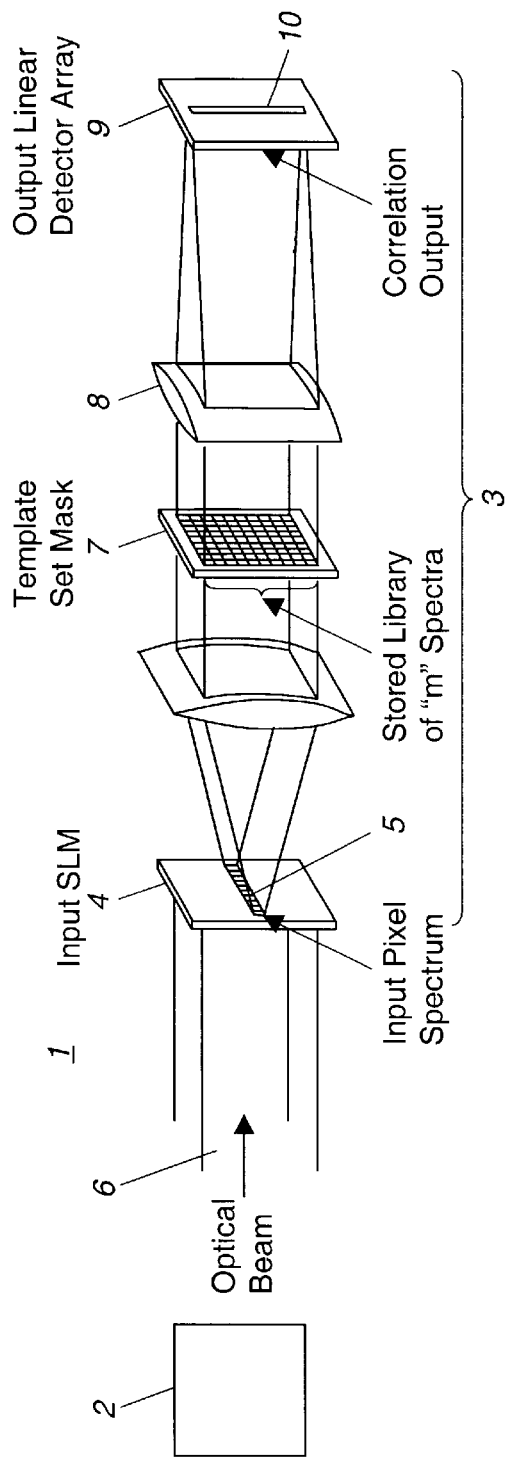
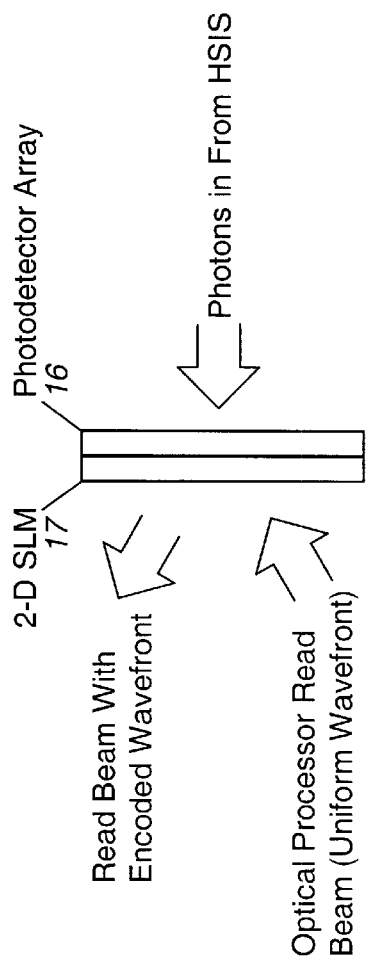

MULTISPECTRAL IMAGING SYSTEM AND METHOD

TECHNICAL FIELD

A multispectral imaging system and method are disclosed for extracting useful scene information from spatial pictures of an image scene in many different spectral wavelength bands. A real time optical processor is used to perform optical correlation.

BACKGROUND AND SUMMARY

Interest in multispectral imaging systems is rapidly increasing. Such systems record spatial pictures of an image scene in many different spectral wavelength bands, e.g., a scene image at red wavelength, green wavelength and is blue wavelength. Differences in the observed spatial image at different wavelengths has been shown to be very useful for finding hidden targets, assaying agricultural conditions, and detecting other subtle features that would not be noticed in a video picture of the scene. Such systems have evolved from several spectral bands, referred to as multispectral, to hundreds of bands, known as hyperspectral, and will continue to evolve into even finer spectral "binning", known as ultraspectral. As this evolution has progressed, the amount of data generated by a multispectral imager has grown to the point where it frequently exceeds the capacity to data link it to a remote location for the extensive of amount of signal processing necessary to extract useful information.

This has led to substantial activity to develop "real-time" processors located at the instrument. These processors thin the data, perform feature extraction, etc. The problem is that even with favorable projections of advances in electronics, the size, weight, and power of electronic real time processors cannot be supported by many multispectral imaging system platforms. There is a need to develop a compact, very low power processor with substantial processing capability to meet existing requirements for real time on-board processing of multispectral imaging system data streams. More specifically, there is a need for a real time processor capable of correlating an input spectrum against template spectra, searching for spatial scene pixels that contain the same spectrum as a designated spectrum or spatial pixel, incorporating atmospheric and calibration corrections, as well as performing other functions.

The improved multispectral imaging system and method of the present invention address these needs by exploiting the three-dimensional attributes of optical correlation to perform massively parallel correlation processing. The expression "multispectral imaging" as used herein is intended to encompass systems having several spectral bands, hundreds of bands or even finer spectral "binning", as referred to above.

The multispectral imaging system according to the invention comprises a multispectral imager for producing spatial pictures of an image scene in a plurality of different spectral wavelength bands. The system further includes an optical processor for simultaneously comparing an input wavelength spectrum observed in a scene image from the multispectral imager with a plurality of template wavelength spectra to find a correlation.

The optical processor includes a first spatial light modulator having an array of modulating elements including n modulating elements arranged linearly for receiving respective ones of n spectral bands of an input wavelength spectrum observed in a scene image from the multispectral imager and independently altering at least one property of an incident light beam by a value corresponding to the observed intensity of the input spectrum in the respective spectral band. A means is provided for expanding a modulated beam of an input wavelength spectrum from the n elements of the first spatial light modulator in a spatial dimension perpendicular to the linear direction of the n elements of the modulator.

A second spatial light modulator of the system in a disclosed embodiment has a two-dimensional array of n×m modulating elements through which the expanded, modulated beam of an input wavelength spectrum from the n elements of the first spatial light modulator is transited. Each row n of the n×m array of elements alters the at least one property of the incident light by values corresponding to a particular template wavelength spectrum of m such template wavelength spectra of the two-dimensional array of elements of the second spatial light modulator. These values corresponding to each template spectrum of the m template spectra are the conjugates of the representative values of the n elements of the template spectrum of the m template spectra.

The at least one property of the incident light of the input spectrum provided to the first spatial light modulator is preferably uniform. Thus, where the input spectrum corresponds to a particular template spectrum of the m template spectra of the second spatial light modulator, the at least one property of the twice modulated light is first altered and then changed back to uniform by the system to permit focusing the light from the second modulator and detecting the intensity thereof to indicate a correlation in the case the input spectrum corresponds to the particular template spectrum of the m template spectra.

The related method of spectral imaging of the present invention utilizes this optical processing of the invention for simultaneously comparing a wavelength spectrum observed for a spatial pixel of a spatial picture of an image scene with a plurality of template wavelength spectra to find a correlation. The simultaneously comparing can be performed simultaneously for each of a plurality of different spatial pixels in the scene image using a two-dimensional spatial light modulator as the input device, rather than a linear spatial light modulator.

These and other objects, features and advantages of the present invention will be made more apparent from the following detailed disclosure of a preferred embodiment of the invention taken with the accompanying drawings.

BRIEF DESCRIPTION OF DRAWINGS

FIG. 1 is a schematic illustration of a multispectral imaging system according to the invention, wherein the processor simultaneously correlates the wavelength spectrum observed for a single spatial pixel in the scene image against multiple template spectra.

FIG. 3 is a schematic illustration of a further feature of the invention wherein the multispectral imaging system focal plane detector is directly interfaced with the optical processor's two-dimensional input spatial light modulator.

DETAILED DESCRIPTION OF THE DISCLOSED EMBODIMENT

Figure 2:
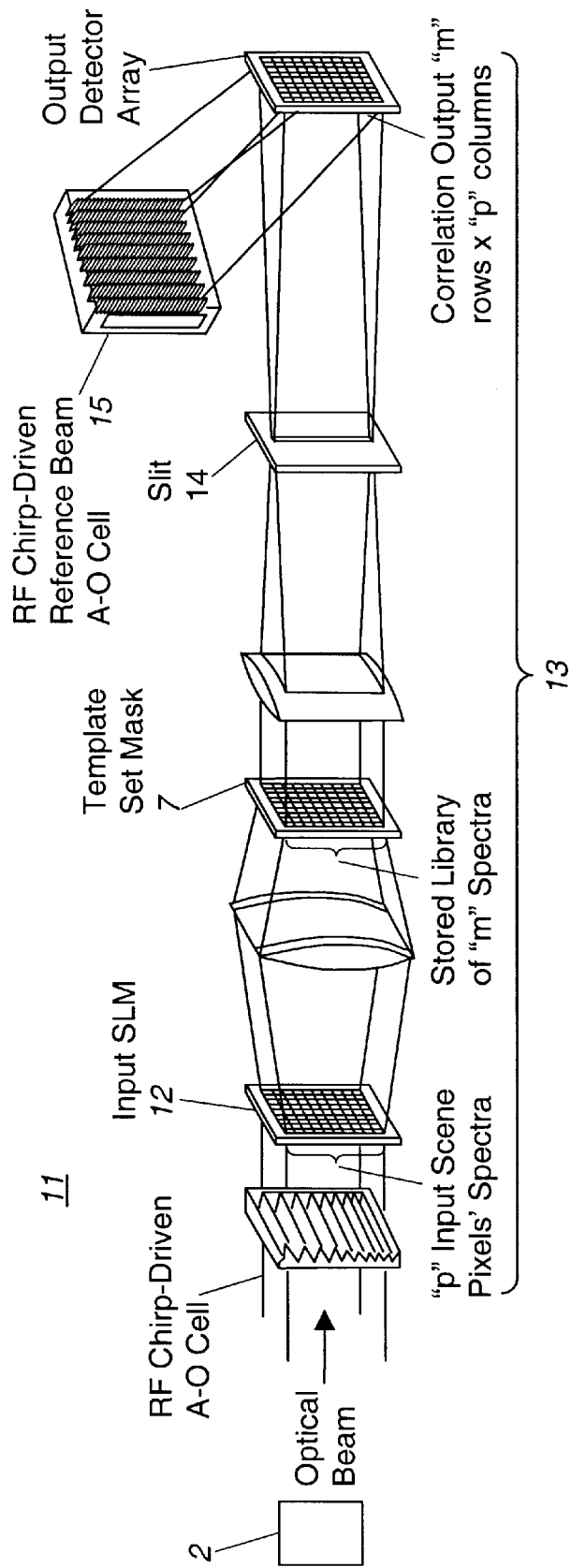
FIG. 2 is a schematic illustration of a preferred embodiment of the multispectral imaging system of the invention capable of processing multiple input wavelength vectors corresponding to the wavelength spectrum for each of a plurality of different spatial pixels in the scene image.

Referring now to the drawings, the multispectral imaging system 1 shown in FIG. 1 is seen to comprise a multispectral imager 2 for producing spatial pictures of an image scene in a plurality of different spectral wavelength bands, and in an optical processor 3 which exploits the three-dimensional attributes of optical correlation to perform massively parallel correlation processing for extracting useful scene information from spatial pictures of the image scene in many different spectral wavelength bands. To this end, a fundamental operation of the processor 3 is to simultaneously correlate a wavelength spectrum observed for a single spatial pixel in the scene image from the imager 2 against multiple template spectra. That is, the optical processor 3 simultaneously compares the observed wavelength spectrum with many target spectra to find a correlation with the observed spectrum.

The spectrum of a single spatial scene pixel is input into the optical processor 3 from the imager 2 by means of a linear spatial light modulator 4 of the processor. The modulator 4 is in the form of a linear array of n modulator elements 5 that can independently alter properties of an incident light beam, such as optical phase and/or intensity. For example, the intensity could be modulated using liquid crystal light modulators as modulating elements. The n elements of this linear array correspond to n spectral bands of the input spectrum where the direction of wavelength ordering of the wavelength spectrum received by the array is along the length of the linear array of the modulating elements 5, and the degree of optical phase shift or intensity change in any particular bin, n', corresponds to the observed intensity from that spatial pixel in the n' spectral band.

An optical beam 6 from the imager 2 initially has a uniform phase or intensity. When the beam passes through the linear array of the modulator 4, its intensity or phase profile is altered and encoded in a manner representing the input wavelength vector. This beam is expanded in the spatial dimension perpendicular to the linear array as depicted in depicted in FIG. 1 and then transits a two-dimensional spatial light modulator 7. Each row of the n×m modulator elements of the modulator 7 has phase or intensity values corresponding to a particular template wavelength spectrum; m such template wavelength spectra being simultaneously displayed on the n×m modulator 7. The modulator 7 is programmed such that the phase or intensity values corresponding to each template spectrum are "conjugate" values of the representative values of the n elements of the template spectrum of the m template spectra. As a result, when the encoded wavefront from the linear input modulator 4 passes through a row of the modulator elements of the two-dimensional modulator 7, the wavefront of the optical beam is changed back to one with uniform phase or intensify. Such a wavefront can be tightly focused into a spot, reflecting a high degree of correlation between the input wavelength vector and that particular template spectrum. This focusing is achieved by the lens 8 shown schematically in FIG. 1.

When the encoded wavefront from the input modulator 4 passes through a row where the template wavelength vector does not closely match the input wavelength vector, the optical wavefront remains distorted, cannot be focused as tightly, and so the spot is broadened, indicating less correlation between the input and template wavelength vectors. An output linear detector array 9 of the processor 3 comprises detector elements 10 corresponding to respective ones of the template spectra for detecting the degree of correlation between the input wavelength vector and respective ones of the template spectra. Mathematically, this system 1 calculates the Fourier transforms of the products of the input wavelength vector with all of the conjugates of the template wavelength vectors. The D.C. terms are then proportional to the desired correlation.

This optical processor 3 of the invention is a compact, very low power processor with substantial processing capability to meet existing requirements for a real-time on-board processing of multispectral imaging system data streams. The compactness of the processor 3 enables it to be packaged on small multispectral imaging system platforms. The real-time massively parallel processing of images by the system 1 according to the method of multispectral imaging of the invention significantly reduces data link and data storage requirements.

Another feature of the multispectral imaging system 1 is that the two-dimensional spatial light modulator 7 for the template spectra can optionally be made addressable. Several additional signal processing steps according to the invention can be accomplished in such case. For example, atmospheric correction can be programmed in by altering the values of the target spectra to match the transmission characteristics of the atmospheric viewing channel of the multispectral imager 2. Another important processing function which can be realized is to look elsewhere for a spectrum which has been observed by the multispectral imager by loading the desired observed input wavelength spectrum into one row of the template modulator 7.

Other variations of the system 1 are possible. For example, with suitable changes in the optical geometry, the two-dimensional spatial light modulator 7 could instead be a holographic storage medium with the template wavelength vectors stored as multiplexed holograms. The storage medium could be optical polymer, or other non-linear medium capable of quasi-permanent holographic recording such as lithium niobate. Alternately, the medium could be a material with strong non-linear optical properties that effectively mix two optical beams, one from the input spatial light modulator 4 and an optically coherent second beam from the two-dimensional template spatial light modulator 7.

The multispectral imaging system 11 of the preferred embodiment of the invention is an extension of the basic system shown in FIG. 1 to process multiple input wavelength vectors. Instead of a linear spatial light modulator as the input device, an n×p two-dimensional spatial light modulator 12 is used in the optical processor 13. In this case, n again corresponds to n spectral bands of a particular spatial pixel's wavelength spectrum, but the second dimension p now corresponds to different spatial pixels in the scene image. In the embodiment of FIG. 2, different optical frequencies address each row in the input spatial light modulator 12, providing a method for sorting out the correlation spots in the output plane. This is accomplished by passing the D.C. terms through a slit 14 and expanding them horizontally and sorting by optical frequency. Then the column p in the out plane will correspond to correlations of the input vector p with the template vectors. This change in optical frequency of the incident optical wave can be realized with the acousto-optic modulator 15 shown in FIG. 2, a linear array of laser diodes or by using a broad band laser followed by a dispersive element. It is also possible to separate p dimension correlations by using angle space, rather than wavelength space, through the optical system.

FIG. 3 shows a further refinement of a system according to the invention, wherein the multispectral imaging system focal plane detector array 16 is directly interfaced to the optical processor's two-dimensional input spatial light modulator 17 to avoid readout and transfer electronics. Such photon detector-to-spatial light modulator pixel systems have been demonstrated. Another possible variation would be that there is no multispectral imaging system focal plane detector array, rather the light from the multispectral imaging system is directly incident on the input spatial light modulator and the resulting change in phase or intensity is directly induced by photons incident on the spatial light modulator. Thus, the two-dimensional input spatial light modulator acts not only as the focal plane output of the multispectral imaging system, but also as the input to the optical processor.

While we have shown and described only several embodiments of the present invention herein, it will be readily understood by the skilled artisan that variations of the multispectral imaging system and method of multispectral imaging disclosed herein are possible without departing from the scope of our invention. Therefore, we do not wish to be limited to the details shown and described herein but intend to cover all such changes and modifications as are encompassed by the scope of the appended claims.

We claim:

1. A multispectral imaging system comprising:
   a multispectral imager for producing spatial pictures of an image scene in a plurality of different spectral wavelength bands; and
   an optical processor for simultaneously comparing an input wavelength spectrum observed in a scene image from said multispectral imager with a plurality of template wavelength spectra to find a correlation, said optical processor including:
      a first spatial light modulator having an array of modulating elements including n modulating elements arranged linearly for receiving respective ones of n spectral bands of an input wavelength spectrum observed in a scene image from said multispectral imager and independently altering at least one property of an incident light beam by a value corresponding to the observed intensity of the input spectrum in the respective spectral band;
      means for expanding a modulated beam of an input wavelength spectrum from said n elements of said first spatial light modulator in a spatial dimension perpendicular to the linear direction of said n elements thereof; and
      a second spatial light modulator having a two-dimensional array of n×m modulating elements through which said expanded, modulated beam of an input wavelength spectrum from said n elements of said first spatial light modulator is transited, each row n of said n×m array of elements altering said at least one property of the incident light by values corresponding to a particular template wavelength spectrum of m such template wavelength spectra of said two-dimensional array of elements of said second spatial light modulator, and wherein said values corresponding to each template spectrum of said m template spectra are the conjugates of said representative values of said n elements of said template spectrum of said m template spectra.

2. The multispectral imaging system according to claim 1, wherein said input spectrum is observed for a single spatial pixel in said scene image.

3. The multispectral imaging system according to claim 1, wherein said first spatial light modulator is a linear spatial light modulator.

4. The multispectral imaging system according to claim 1, wherein said at least one property of the incident light altered by the elements of said first and second spatial light modulators is at least one of optical phase and intensity.

5. The multispectral imaging system according to claim 4, wherein said at least one property is both optical phase and intensity.

6. The multispectral imaging system according to claim 4, wherein said at least one property of said incident light of said input spectrum provided to said first spatial light modulator is uniform.

7. The multispectral imaging system according to claim 1, further comprising means for focusing the beam of said modulated input spectrum which has transited said second spatial light modulator.

8. The multispectral imaging system according to claim 7, further comprising means for detecting the intensity of said focused beam for each of said m template spectra.

9. The multispectral imaging system according to claim 1, wherein said array of n elements of said first spatial light modulator is part of an n×p two-dimensional spatial light modulator where the first dimension n corresponds to the spectrum observed for a single spatial pixel in the scene image and the second dimension p corresponds to the spectra observed for different spatial pixels in the scene image.

10. The multispectral imaging system according to claim 9, wherein said optical processor further comprises means for addressing each row p of elements in said first spatial light modulator with a different optical frequency to permit sorting out of the correlation spots with said optical processor.

11. The multispectral imaging system according to claim 10, further comprising means for sorting out correlation spots from said second spatial light modulator by optical frequency.

12. The multispectral imaging system according to claim 1, wherein said multispectral imager includes an image plane detector array which is directly interfaced to said first spatial light modulator of said optical processor.

13. The multispectral imaging system according to claim 12, wherein the image from said multispectral imager is directly incident on said first detector array/spatial light modulator such that a resulting change in said at least one property of said incident beam of said processor is directly induced by photons incident on said first detector array/spatial light modulator.

14. In a method of multispectral imaging comprising the steps of producing spatial pictures of an image scene in a plurality of different spectral wavelength bands and utilizing differences in the observed spatial image at different wavelengths for detecting a feature of the scene, the improvement comprising simultaneously comparing a wavelength spectrum observed for a spatial pixel of a spatial picture of an image scene with a plurality of template wavelength spectra to find a correlation, wherein said simultaneously comparing includes:
   modulating the light of respective ones of a plurality of spectral bands of said wavelength spectrum to independently alter at least one property of the light by a representative value corresponding to the observed intensity of the wavelength spectrum in the respective spectral band,
   expanding a beam of the modulated light in a spatial dimension perpendicular to a direction of wavelength ordering of said wavelength spectrum,
   further modulating the light of respective ones of said spectral bands of said expanded, modulated beam of the wavelength spectrum in each of a plurality of parallel directions extending across said plurality of spectral bands of said expanded beam to alter said at least one property of the light by values corresponding to respective ones of a plurality of template wavelength spectra, wherein said values corresponding to each template wavelength spectrum of said plurality of template wavelength spectra are the conjugates of said representative values of said template spectrum of said template wavelength spectra.

15. The method according to claim 14, wherein said at least one property of the light modulated is at least one of optical phase and intensity.

16. The method according to claim 14, including performing said step of simultaneously comparing each of a plurality of different spatial pixels in the scene image.

17. The method according to claim 14, further comprising focusing the further modulated beam of the wavelength spectrum and detecting the intensity of the focused beam for each of said plurality of template wavelength spectra.

18. The method according to claim 14, wherein said at least one property of said incident beam is uniform.

19. The method according to claim 14, wherein said plurality of template wavelength spectra include an unknown input spectrum.

20. In a method of multispectral imaging comprising the steps of producing spatial pictures of an image scene in a plurality of different spectral wavelength bands and utilizing differences in the observed spatial image at different wavelengths for detecting a feature of the scene, the improvement comprising simultaneously comparing a plurality of wavelength spectra observed for respective ones of a plurality of spatial pixels of a spatial picture of an image scene with at least one template wavelength spectrum to find a correlation, wherein said simultaneously comparing includes:

modulating the light of respective ones of a plurality of spectral bands of each of said plurality of wavelength spectra to independently alter at least one property of the light by a representative value corresponding to the observed intensity of the corresponding wavelength spectrum in the respective spectral band, expanding a beam of the modulated light in a spatial dimension perpendicular to a direction of wavelength ordering of said wavelength spectra, further modulating the light of respective ones of said spectral bands of said expanded, modulated beam of the wavelength spectrum in each of a plurality of parallel directions extending across said plurality of spectral bands of said expanded beam to alter said at least one property of the light by values corresponding to at least one template wavelength spectrum, wherein said values corresponding to said at least one template wavelength spectrum are the conjugates of said representative values of said at least one template wavelength spectrum.

* * * * *